United States Patent
Bordawekar et al.

(10) Patent No.: US 10,831,752 B2
(45) Date of Patent: Nov. 10, 2020

(54) SEMANTIC RELATIONAL DATABASE OPERATIONS

(71) Applicant: International Business Machines Corporation, Armonk, NY (US)

(72) Inventors: Rajesh Bordawekar, Millwood, NY (US); Oded Shmueli, Nofit (IL)

(73) Assignee: International Business Machines Corporation, Armonk, NY (US)

( * ) Notice: Subject to any disclaimer, the term of this patent is extended or adjusted under 35 U.S.C. 154(b) by 219 days.

(21) Appl. No.: 15/962,392

(22) Filed: Apr. 25, 2018

(65) Prior Publication Data

US 2019/0332705 A1  Oct. 31, 2019

(51) Int. Cl.
*G06F 16/2453* (2019.01)
*G06N 20/00* (2019.01)

(52) U.S. Cl.
CPC .. *G06F 16/24542* (2019.01); *G06F 16/24537* (2019.01); *G06N 20/00* (2019.01)

(58) Field of Classification Search
CPC .............. G06F 16/24537; G06F 16/24542
See application file for complete search history.

(56) References Cited

U.S. PATENT DOCUMENTS

| | | | |
|---|---|---|---|
| 8,468,160 B2 | 6/2013 | Hassanzadeh et al. | |
| 2010/0299294 A1* | 11/2010 | Mott | G06F 16/285 706/20 |
| 2011/0078159 A1* | 3/2011 | Li | G06F 16/24534 707/749 |
| 2015/0127342 A1* | 5/2015 | Sharifi | G10L 17/005 704/239 |
| 2016/0132521 A1* | 5/2016 | Reininger | G06F 16/156 707/739 |
| 2017/0147575 A1* | 5/2017 | Pappu | H04W 4/023 |
| 2018/0204113 A1* | 7/2018 | Galron | G06K 9/6267 |
| 2019/0108217 A1* | 4/2019 | Chen | G06F 40/30 |

FOREIGN PATENT DOCUMENTS

CN    110399392 A    11/2019

OTHER PUBLICATIONS

Al Marri et al., "The Similarity-aware Relational Database Set Operators", Preprint submitted to Elsevier, Jul. 17, 2015, pp. 1-33.
(Continued)

*Primary Examiner* — Scott A. Waldron
(74) *Attorney, Agent, or Firm* — William H. Hartwell (57) ABSTRACT

A method, computer program product and/or system is disclosed. According to an aspect of this invention, one or more processors receive a query of a first database, where the query includes: (i) an operand, and (ii) an operator indicating a distance-based similarity measure. One or more processors further determine a result set based on the query, wherein the result set includes a plurality of records, and wherein a record is included in the result set based on a vector nearest-neighbor computation between: (i) a first vector corresponding to the operand, and (ii) a second vector corresponding to the record, wherein the second vector is included in a vector space model that is based on a textual representation of the first database.

17 Claims, 6 Drawing Sheets

(56) References Cited

OTHER PUBLICATIONS

Bordawekar et al., "A Method and System for Semantic-Based Queries Using Word Vector Representation", U.S. Appl. No. 14/940,716, filed Nov. 13, 2015, 40 pages.
Bordawekar et al., "Creating Cognitive Intelligence Queries From Multiple Data Corpuses", U.S. Appl. No. 15/463,053, filed Mar. 20, 2017, 38 pages.
Bordawekar et al., "Enabling Cognitive Intelligence Queries in Relational Databases using Low-dimensional Word Embeddings", arXiv:1603.07185v1 [cs.CL] Mar. 23, 2016, 12 pages.
Ji et al., "Super-Bit Locality-Sensitive Hashing", Neural Information Processing Systems (NIPS), 2012 (/book/advances-in-neural-information-processing-systems-25-2012), © 1987—2017 Neural Information Processing Systems Foundation, Inc, 10 pages, <https://papers.nips.cc/paper/4847-super-bit-locality-sensitive-hashing.pdf>.
Kayzhu/Lshash, "A fast Python implementation of locality sensitive hashing", GitHub, © 2017 GitHub, Inc., 3 pages printed on Aug. 14, 2017, <https://github.com/kayzh/LSHash).
Silva et al., "Similarity queries: their conceptual evaluation, transformations, and processing", The VLDB Journal DOI 10.1007/s00778-012-0296-4, Published online: Nov. 8, 2012, Springer, 26 pages.
Wikipedia, "Locality-sensitive hashing", From Wikipedia, the free encyclopedia, This page was last edited on Jun. 23, 2017, 4 pages, printed on Aug. 14, 2017, <https://en.wikipedia.org/wiki/Locality-sensitive_hashing>.

\* cited by examiner

DATABASE TABLE EMP 405

| Name | Topic | Forum | PNum |
|---|---|---|---|
| Joshi | Checkpoint | VLDB98 | 11 |
| Agrawal | Recovery | SIGMOD85 | 22 |
| Agrawal | Similarity Joins | ICDE97 | 33 |

VECTOR SPACE MODEL 410

CHECKPOINTING 415

| Word | Cosine Distance |
|---|---|
| checkpoint | 0.648436 |
| rollback | 0.633910 |
| logging | 0.632423 |
| recovery | 0.561662 |

ARCHITECTURES 420

| Word | Cosine Distance |
|---|---|
| architecture | 0.674868 |
| platforms | 0.594154 |
| processors | 0.576554 |
| systems | 0.528832 |

JOINS 425

| Word | Cosine Distance |
|---|---|
| join | 0.689809 |
| queries | 0.639728 |
| indexes | 0.554961 |
| selections | 0.491068 |

SIMILARITY 430

| Word | Cosine Distance |
|---|---|
| dissimilarity | 0.578342 |
| proximity | 0.552494 |
| content | 0.516919 |

FIG. 4B

RESULT SET 435

| Name | Topic | Forum | PNum |
|---|---|---|---|
| Joshi | Checkpoint | VLDB98 | 11 |
| Agrawal | Recovery | SIGMOD85 | 22 |

FIG. 4C

SEMANTIC RELATIONAL DATABASE OPERATIONS

BACKGROUND

The present invention relates generally to the field of databases, and more particularly to introducing semantic relational operations in a database query language.

Word embedding refers to language modeling and feature learning techniques used to represent words or phrases as vectors of real numbers. These word embeddings allow for the computation of similarity of text corpora using machine learning algorithms.

SUMMARY

According to an aspect of the present invention, there is a method, computer program product and/or system that performs the following operations (not necessarily in the following order): (a) receiving a query of a first database, where the query includes: (i) an operand, and (ii) an operator indicating a distance-based similarity measure; and (b) determining a result set based on the query, wherein the result set includes a plurality of records, and wherein a record is included in the result set based on a vector nearest-neighbor computation between: (i) a first vector corresponding to the operand, and (ii) a second vector corresponding to the record, wherein the second vector is included in a vector space model that is based on a textual representation of the first database.

DETAILED DESCRIPTION

A relational database is a database structured to recognize relations among stored items of information based on the relational model, where the data is organized into one or more tables of columns and rows. Each row in a relational model may also be referred to as a record or tuple. In this context, relations represent a connection between different tables, established on the basis of interaction (or common data) among these tables. Commonly, these relations are represented by providing a unique key for each row in a table (e.g., a primary key). A row in a table is related to rows in other tables by referencing the unique key of the linked row (e.g., a foreign key).

In relational databases, operators are programming constructs that are capable of manipulating individual values and returning a result. These individual values are known as operands or arguments. Common operators include arithmetic operators that manipulate numeric operands (e.g., addition, subtraction, division, and multiplication, among others), set operators that combine sets of rows returned by SQL queries (e.g., union, intersect, complement, among others), logical operators that manipulate results of conditions (e.g., and, or, not, among others), and comparison operators used in conditions that compare one expression to another (e.g., equal, not equal, less than, greater than, in, not in, between, like, among others).

Some embodiments of the present invention recognize current database operators only support value-based matching. For example, the expression "Topic='checkpointing'" evaluates whether the value of field Topic is exactly equal to the character string checkpointing without taking into account the semantic proximity of the value of the field Topic and the word checkpointing. To overcome one or more disadvantages, embodiments of the present invention introduce a new type of relational operator based on semantic relationships in structured databases. This approach enables relational systems to match entities by their semantics, which is determined by their context, by implementing core relational operators (e.g., select, project, join, group-by, among others). To achieve this goal, core relational operations are executed in a vector space using vector-based representations generated by a neural network.

This Detailed Description section is divided into the following sub-sections: (i) The Hardware and Software Environment; (ii) Example Embodiment; (iii) Further Comments and/or Embodiments; and (iv) Definitions.

I. THE HARDWARE AND SOFTWARE ENVIRONMENT

The present invention may be an apparatus, a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
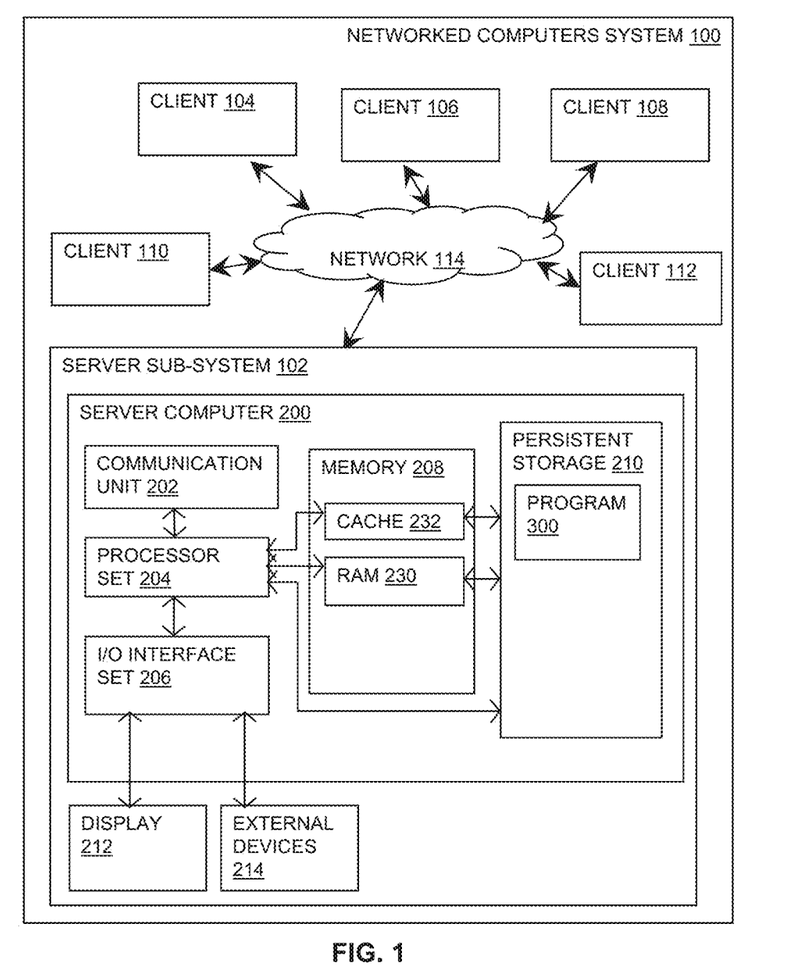
FIG. 1 is a block diagram view of a first embodiment of a system according to the present invention.

An embodiment of a possible hardware and software environment for software and/or methods according to the present invention will now be described in detail with reference to the Figures. FIG. 1 is a functional block diagram illustrating various portions of networked computers system 100, including: sub-system 102; sub-systems 104, 106, 108, 110, 112; network 114; computer 200; communications unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Figure 2:
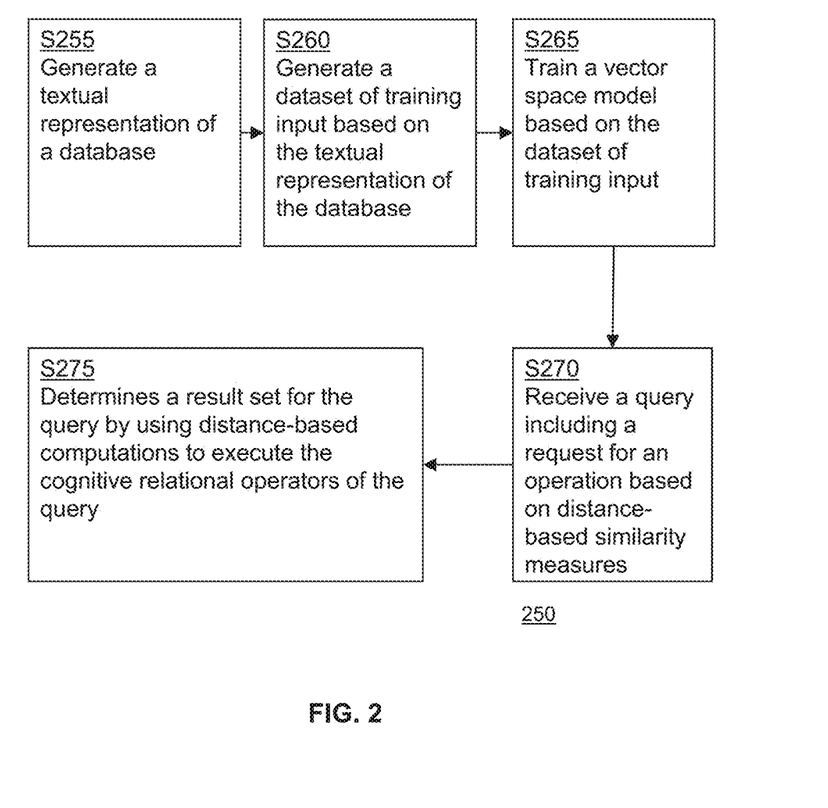
FIG. 2 is a flowchart showing a first embodiment method performed, at least in part, by the first embodiment system.
Figure 3:
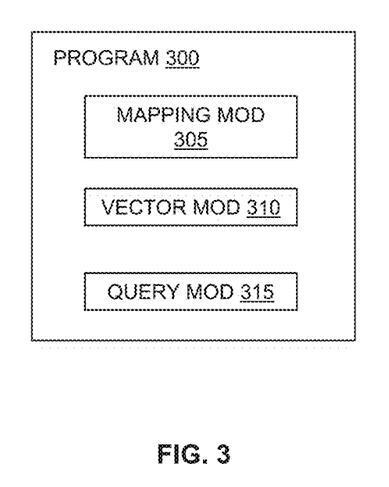
FIG. 3 is a block diagram showing a machine logic (for example, software) portion of the first embodiment system.

Processor set 204 may include a combination of electronic circuits (for example, combinations of semiconductor structures such as transistors, resistors, capacitors and the like that are organized into an electronic circuit that is configured to execute one or more of the processes described in the discussion of FIGS. 1-3) included in one or more integrated circuit chips. As such, the one or more integrated circuit chips are configured to execute at least a part of the processes described in the discussion of FIGS. 1-3. Integrated circuit chips may be incorporated as part of a computing system that is configured to execute at least a part of the processes described in the discussion of FIGS. 1-3.

Memory device 208 and persistent storage device 210 are computer-readable storage media. In general, memory device 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage device 210 for access and/or execution by one or more of the respective processor set 204, usually through one or more memories of memory device 208. Persistent storage device 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage device 210.

Program 300 may include both machine readable and performable instructions and/or substantive data (that is, the type of data stored in a database). In this particular embodiment, persistent storage device 210 includes a magnetic hard disk drive. To name some possible variations, persistent storage device 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage device 210 may also be removable. For example, a removable hard drive may be used for persistent storage device 210. Other examples include optical and magnetic disks, thumb drives, and smart cards that are inserted into a drive for transfer onto another computer-readable storage medium that is also part of persistent storage device 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. EXAMPLE EMBODIMENT

FIG. 2 shows flowchart 250 depicting a method according to the present invention. FIG. 3 shows program 300 for performing at least some of the method operations of flowchart 250. These methods and associated components will now be discussed, over the course of the following paragraphs, with extensive reference to FIG. 2 (for the method operation blocks), and FIG. 3 (for the software blocks).

Referring to flowchart 250 (see FIG. 2), processing begins at operation S255, where a mapping module ("mod") 305 (see FIG. 3) generates a textual representation of a database. In some embodiments of the present invention, the textual representation of the database is obtained by concatenation of all relations in the database. In some embodiments, the textual representation is extended by concatenation of multiple tables related by a foreign key. In some embodiments, tokens are obtained for each record in the textual representation. In some embodiments, a token is a sequence of characters with no intervening blank space. In some embodiments, the token represents a text entity.

Figure 4A:
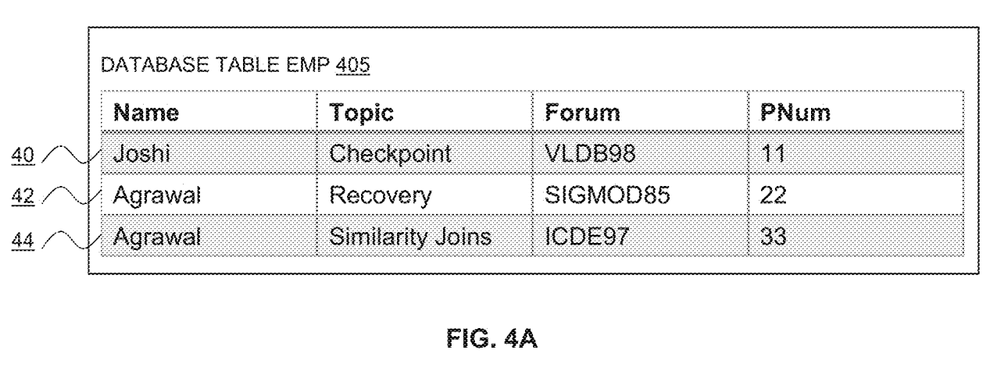
FIG. 4A is a block diagram view of a table of a database according to an exemplary embodiment.

In an exemplary embodiment (shown in FIG. 4A), database table EMP 405 of a database includes the following columns: (i) Name, (ii) Topic, (iii) Forum, and (iv) PNum. In this exemplary embodiment, mapping mod 305 generates a textual representation of the database by concatenating each field of each record. In some embodiments, each record is included in the textual representation as a new line (i.e., each line of the textual representation corresponds to a record in the database, as shown in FIG. 4A).

Processing continues at operation S260 (see FIG. 2), where a vector module 310 (see FIG. 3) generates a dataset of training input based on the textual representation of the database. In some embodiments of the present invention, to generate the dataset of training input, mapping mod 305 pre-processes the textual representation to obtain a consistent evaluating and training data. In some embodiments, pre-processing the textual representation may include lowercasing, lemmatization, word groupings, and tokenization, among others. A person skilled in the art would recognize that pre-processing varies depending on the nature of the textual representation. For example, pre-processing techniques may vary depending on whether the textual representation belongs to a specialized domain (e.g., health, genetics, social network data, among others). Pre-processing techniques may also vary depending on the particular application of the query. For example, sentiment analysis may require different pre-processing of the textual representation than pre-processing for health applications.

Processing proceeds at operation S265 (see FIG. 2), where the vector module 310 (see FIG. 3) trains a vector space model based on the dataset of training input (e.g., continuous bag-of-words model or skip-gram model). In some embodiments of the present invention, a vector space model is an algebraic model for representing text documents. In some embodiments, the vector space model enables vector nearest-neighbor based computations where two or more entities may match based on their relevance or their similarity (e.g., as opposed to an exact match). In some embodiments, the vector space model is trained using word2vec or similar group of models to generate word embeddings. In some embodiments, the vector space model is trained using matrix and optimization-based method for generating word vectors for a text, such as Glove. In some embodiments, the vector space model is trained for each token in the training input. In some embodiments, the vector space model may be determined according to a locality sensitive hashing (LSH) approach. These aspects of the invention are discussed in more detail, below, in the Further Comments and/or Embodiments sub-section of this Detailed Description.

Figure 4B:
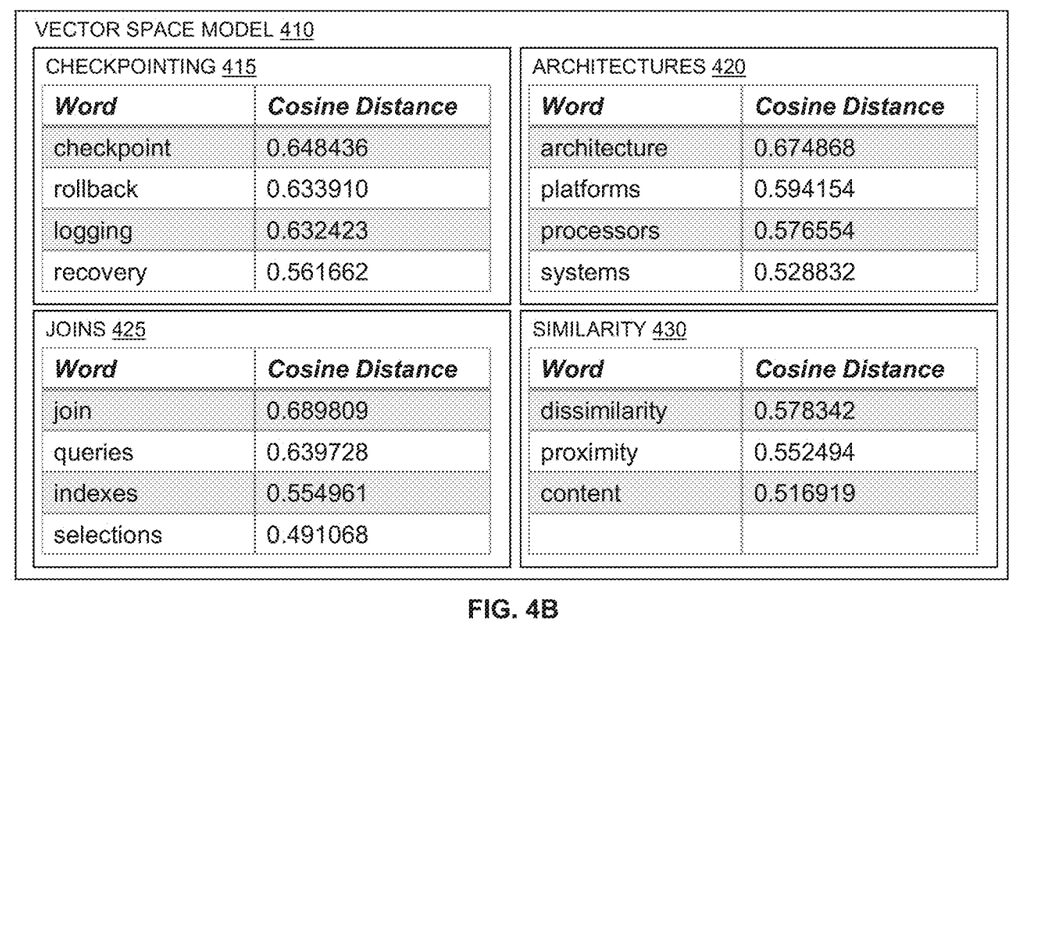
FIG. 4B is a block diagram view of a vector space model according to an exemplary embodiment.

Continuing the exemplary embodiment, vector module 310 trains a vector space model as shown in FIG. 4B.

Processing proceeds to operation S270 (see FIG. 2), where a query module 315 (see FIG. 3) receives a query including a request for an operation based on distance-based similarity measures. In some embodiments, the operation includes improved operators, also referred to herein as cognitive relational operators, which match the query based on an operation using distance-based similarity measures as discussed below. In these embodiments, a record matches the query based on a vector nearest-neighbor computation of at least one token in the vector space model. In some embodiments, these cognitive relational operators include: joins, semi-joins, outer-joins, projection, selection, order-by, and group-by, among other operators. However, these examples are not meant to be limiting, and the operation may comprise any such relational operator known (or yet to be known) in the art.

In the exemplary embodiment, query module 315 receives the following selection query based on an operation using distance-based similarity measures:

SELECT*FROM EMP WHERE
  Topic='checkpointing';

Processing continues at operation S275 (see FIG. 2), the query module 315 (see FIG. 3) determines a result set for the query by using distance-based computations to execute the cognitive relational operators of the query. In some embodiments of the present invention, the result set includes at least one result based on a vector nearest-neighbor computation.

In some embodiments, vector nearest-neighbor based computations to execute the cognitive relational operators are provided. In some embodiments, multiple alternatives for comparing two sets of tokens are included. In some embodiments, comparing two sets of tokens term1 and term2 includes comparing the average distance between a token in term1 and a token in term2 (e.g., avg(term1, term2)>=0.5). In these and other embodiments, comparing two sets of tokens may include comparing the maximum distance (e.g., max(term1, term2)>=0.5), the difference distance (e.g., abs(term1, term2)>=0.5), the ordinary distance (e.g., term1>=0.5), or a combination of these operations or any other similar operations for comparing vectors.

Figure 4C:
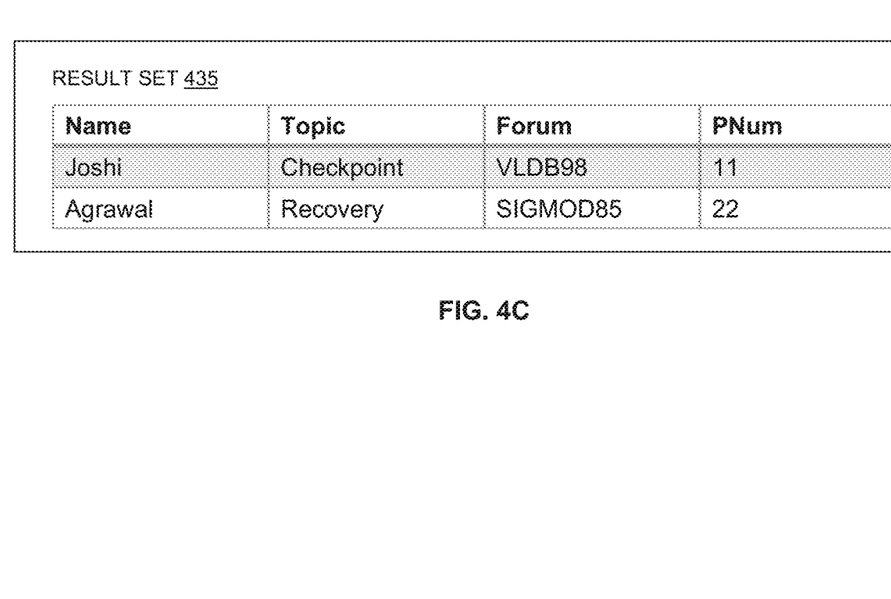
FIG. 4C is a block diagram view of a result set according to an exemplary embodiment.

Continuing the exemplary embodiment, the result set returned after successful execution includes two rows as shown in FIG. 4C. In this exemplary embodiment, both rows of the result set include results in the Topic column, where the cosine distance of the term checkpointing and the content of the Topic column is greater than a predetermined threshold of 0.5. Referring to FIG. 4B, vector space model 410 includes table checkpointing 415, table architectures 420, table joins 425, and table similarity 430. These tables relate the cosine distances of a term with respect to each of a plurality of tokens. Table checkpointing 415, for example, is related to the cosine distances between the term checkpointing and tokens checkpoint, rollback, logging, and recovery. These cosine distances are used to determine the result set as follows.

According to table checkpointing 415, the cosine distance between the term checkpointing and the token checkpoint, which appears in record 40, is 0.648436. Therefore, record 40 is included in the result set 435 (see FIG. 4C). Similarly, according to table checkpointing 415, the cosine distance between the term checkpointing and the token recovery, which appears in record 42, is 0.561662. Therefore, record 42 is included in the result set 435. In contrast, the tokens similarity and joins found in record 44 do not appear in table checkpointing 415. Therefore, record 44 is not included in the result set 435.

III. FURTHER COMMENTS AND/OR EMBODIMENTS

In some embodiments of the present invention, a query language, such as SQL, may be augmented by text entity capabilities. In some embodiments, each database record r is mapped into a textual representation (e.g., by concatenation of multiple fields). In some embodiments, each relation R is mapped to a textual representation of all records r in the relation R. In some embodiments, each database D is mapped to a textual representation of all relations R in database D.

In some embodiments, non-textual fields are also mapped into an alternate text. In some embodiments of the present invention, non-textual fields may be mapped into a textual representation by converting the non-textual field into a string. In some embodiments, non-textual fields are represented by a collection of clusters of similar entities. In some embodiments, non-textual fields may represent one or more categories (e.g., for classification purposes).

In some embodiments of the present invention, a textual representation is extended by use of foreign keys. For example, consider a relational database D, and relations R1 and R2 in D. Let f1 be a column in R1 and f2 be a column in R2, where column f1 is a foreign key into R2 whose key field is f2. Consider a tuple t in the join of R1 and R2 on f1=f2, namely the foreign key value equals the key value. Converting text(t) and adding to the corpus (i.e., concatenating to the sequence generated from the database) allows embedding of records related by the foreign key. This can be extended to multi-column foreign keys.

A neural network for matching entities may be trained, in some embodiments, by the following methods: (i) on text entity sequences derived, at least in part, from a database, (ii) on text entities sequences derived, at least in part, from a plurality of databases; (iii) sequences derived, at least in part, on a data source different than the database upon which a query may be desirable (e.g., external domain datasets such as the computer science bibliography dblp, or other data sources); or (iv) any combinations of the above. In some embodiments, training may be continuous and incremental. One example of such neural networks are the networks used by word2vec. These networks are trained in one of two basic ways: SKIPGRAM and CBOW. These networks may also employ an optimization called negative sampling.

In some embodiments of the present invention, a token is a sequence of characters with no intervening blank space. In some embodiments, each token defines a text entity. Text entities have relationships with other text entities. These relationships may be expressed numerically (e.g., cos(e1, e2)>0.5). In some embodiments, the relationship may be expressed verbally on a scale (e.g., very_strong, strong, moderate, weak, very_weak) to enable defining numeric values separately (e.g., very_strong=0.95).

In some embodiments of the present invention, the textual representation of a database D is obtained (e.g., by mapping mod 305). In some embodiments, a low-dimensional (e.g., 200) vector representation is assigned to each database token. In some embodiments, tokens that co-occur are assigned vectors having a high cosine distance. In some embodiments, these vectors are also used for checking analogies using vector addition. These vectors may be computed by neural network-based techniques, such as Word2Vec, where a neural network model is built, using the textual representation as input. The neural network model captures the semantic relationships between tokens and returns vectors that capture the relationships.

In some embodiments of the present invention, text-vector related constructs (e.g., by extending core relational operators in a query optimizer or by user-defined functions) are provided for a query language (e.g., SQL) to provide the ability to query databases based on relations that do not rely on deep schema knowledge. For example, the query "R.column contains entity" may match the appearance of an entity in a tuple field. Similarly, the query "R.* contains entity" may match the appearance of an entity in a tuple and the query "R contains entity" may match the appearance of an entity in a relation. Other examples include "R.column contains more than 50 occurrences of entity" or "R.column contains less than 10 occurrences of entity" where the appearance strength of a text entity in a tuple field is weighed or greater than a pre-determined threshold. In yet another example, entities can be used in a similar way to keys in a traditional database query as follows:

Relation S; Text Entity e1, e2;
Select EMP.Name, EMP. Salary, S.column?
EMP.*contains e1 AND S.column? contains e2 AND cos(e1, e2)>0.75

In the preceding example, fields Name and Salary from table EMP and the related fields from unknown relation S are retrieved such that the closeness of text entities e1 and e2 effectively links the records in EMP and S.

In some embodiments of the present invention, cross-database relationships may be queried in the same way as described above. For example, consider two databases D1 and D2. Consider a corpus C comprising text(D1) concatenated with text(D2). By training vectors on corpus C, queries that access both D1 and D2 can be written. Alternatively, vectors may be trained on a third data or text source or together with a third data or text source. In some embodiments, a relation R1 of database D1 can be used to navigate fields in D2 using entities in a similar way as described above (e.g., see FIG. 4B). If D1 and D2 are trained separately, similar entities in D1 and D2 can be found using analogy techniques. This can be extended to a plurality of databases.

In some embodiments of the present invention, non-relational databases (e.g., XML, RDF, among others) can be represented in the same, or similar way, as described above. Consider a non-relational database D. The database D is converted to text (e.g., by conversion-to-text functionality). Similarly, query languages for non-relational databases (e.g., XQuery, Xpath, SPARQL) can be extended to provide the ability to query databases based on relations that do not rely on deep schema knowledge. For example, forming of tuples using foreign keys may be implemented on XML data by creating text out of two elements linked by ID and IDREF.

In some embodiments of the present invention, clustering refers to an unsupervised learning technique consisting of grouping a set of tokens based on the characteristics of the tokens. In some embodiments, a cluster may consist of tokens that are similar to other tokens in the same cluster (i.e., intra-class similarity). In some embodiments, a cluster may consist of tokens that are dissimilar to tokens in other clusters (i.e., inter-class dissimilarity). In some embodiments of the present invention, clustering is performed by various methods: (i) partitioning methods. (ii) hierarchical methods, (iii) density-based methods; (iv) grid-based methods; and/or (v) model-based methods. In some embodiments, algorithms for clustering include: algorithms such as K-Means.

Clustering allows to query the sub-relations and compute aggregates, among other operations. In some embodiments, tuples arising out of more than one relation can also be clustered. Clustering enables tuples with tokens of similar meaning to be grouped together. In some embodiments of present invention, each field or tuple may be associated with a vector which is the sum of the entities appearing in it, normalized to length 1. This allows partitioning a relation based on a field into sub-relations, each associated with a class, implied by clustering the relevant vectors into classes.

In some embodiments of the present invention, locality sensitive hashing (LSH) is a method in which a data structure is used to determine, given a vector V, vectors with high proximity to V. In this context, high proximity refers to Euclidean distance and/or cosine distance. In some embodiments, LSH is an alternative to scanning through a whole collection of candidate vectors while providing a high degree of confidence a small set of candidate vectors. There are a number of methods for realizing LSH. A core functionality of all methods includes storing (vector, item) pairs. Given a query(vector1), the "closest" stored vectors to vector1 are located and their associated items as well as the vectors are returned. The idea is to quickly detect proximity without scanning all, or a large portion, of the stored vectors.

In some embodiments of the present invention, a basic feature is to associate a bit vector of a fixed length m with every vector. This is also referred to as "hashing" the vector to a key. The vector hashing is designed such that vectors in the same direction have the same key and those that point in slightly differing directions have "similar" keys. Technically, the keys of vectors that point with an angle difference $\varphi$ may have different bits in several locations of the k bits keys. However, the expected number of differing bits (also referred to as the Hamming distance) is proportional to $\varphi$ and, therefore, if the angle $\varphi$ is small, the Hamming distance will also be small. Although the expected Hamming distance is small, the variance may be large, depending on the particular method used. Low variance schemes may be obtained by specific methods such as the Super-Bit LSH.

In some embodiments of the present invention, LSH methods are used to implement cognitive relational operators (CROs) in relational databases. These operators then further extend to query-based languages such as SQL.

In some embodiments of the present invention, LSH is implemented as follows. Given the semantic selection operator, a. Consider the relationship R(A, B). In the equation $\sigma_{exp}(R)$, exp may now contain an atom of the form: (i) avgCosine(arg1, arg2), (ii) maxCosine(arg1, arg2); and/or (iii) ordCosine(arg1, arg2), where arg1, arg2 may be A, B, or a string constant (e.g., "Mercury Pluto Mars").

The arguments arg1 and arg2 are turned into word vectors and return a cosine distance as follows. For avgCosine, compute cosine distance between each pair of vectors, consisting of one word in arg1 and one in arg2 and compute the cosine distance between these vectors, and return the average value of the cosine distances. For maxCosine, compute the cosine distance between each pair of vectors, one for a word in arg1 and one for a word in arg2, and return the maximum value. For ordCosine, perform pair-wise calculations as in maxCosine, weigh them by the positional distance between the two arguments, and return the average. For example: $\sigma_{avgCosine(A, "Mercury\ Pluto\ Mars")>0.4}(R)$.

The LSH structure may be used to efficiently implement this semantic selection operation. At the outset, for each column C, an LSH structure containing all the entries in column C of R is constructed. Given a selection operation as above, "Mercury Pluto Mars" into is converted to a word vector V. Usually V is the average of the vectors for "Mercury," "Pluto," and "Mars," but other schemes are possible (e.g., weighting in accordance to listing order, among others). The LSH service is later queried for all column A, vectors W (and associated values), for which the cosine-distance of V and W is larger than 0.4. The LSH service may expand the search by manipulating the hash key, looking at larger hamming distances as described below.

As noted, the LSH has a hash key K of fixed length m. The following method may be used to ensure a high probability that all relevant results are returned. Suppose K=010110 (i.e., k=6). After retrieving all relevant records whose hash key is K, records whose hash keys are Hamming distance=1 from K, namely K1=010111, K2=010100, K3=010010, K4=011110, K5=000110, and K6=110110 are also considered. If none of the selected hash keys satisfy the condition of cosine distance with V is larger than 0.4, execution halts (a heuristic rule that may be refined, say if the number found is less than a parameter M). Otherwise, keys that are within a Hamming distance=2 from K are considered. A desirable property of Hamming distances in this context is that when considering distances up to j+1 after checking distances up to j, generation of keys that were already generated when j was considered will not be repeated. In the worst case all records (vectors stored for A in the hash table) will be considered. A possible optimization would be to switch to a linear scan of all records (vectors for Column A), if scanning more than u % (a parameter) by this bit manipulation scheme is necessary. Another possible optimization is to randomly choose a portion of the Hamming distance=u keys (trading preciseness for greater efficiency).

The combination of the Cartesian product operator and semantic selection gives rise to a new semantic join operator. The $\theta$-join variation is straightforward. The natural join is based on equality of arguments from identically named columns. The new semantic natural join has the form R |X|sen S where sen is distance-sensitivity which means that entries in any column, say A, are considered (semantically) equal if the cosine distance between their associated vectors is greater than sen. In some embodiments, semantic proximity replaces the traditional syntactic equality. Similarly, the semantic semijoin ($\propto$sen) and the various versions of outer joins replace the traditional syntactic equality. In other words, cognitive SQL queries employing cosine-similarity vector comparisons may be compiled into semantic relational operators.

One way of implementing the semantic join is as follows. Suppose R and S only have column A in common. First, loop through entries of column A of one of the relations, for example R. Each entry E forms a vector V for which a search is performed in the LSH structure of column A of S, namely S.A. All the S.A entries of vectors found, whose cosine distance with V is higher than or equal to sen, are qualifying for the join with the A entry. There may be additional entries in S.A which can be found using the same bit manipulation technique of semantic selection. A possible variation includes determining sen,j where j indicates how large a Hamming distance that could be considered. As in the case of selection, if the bit manipulation yields no result no attempt is made to further manipulate larger Hamming distances. Although this is a reasonable heuristic, it does not guarantee that there are additional qualifying entries but the probability for such entries is relatively low, especially for the common practice of using a multiplicity of hash tables. Another possible variation is sen,j,p where p is the percentage of randomly selected keys for probing when the Hamming distance j is considered.

Consider R(A,B,C) and S(A,B,D). The two columns of interest are A and B. Suppose these columns are ordered with A and then B. After semantic proximity for A is computed, the relevant tuples for the processing of B are known (i.e., only those tuples whose A entries qualified for column A). As such, in considering column B, looping through S.B may be performed by only considering those tuples whose A entry qualified. This technique yields an efficient scan for multi-columns. Another possibility is operating in a multi-core environment or a GPU environment. In this case, operation on the columns A and B may be performed, separately and in parallel, and the results are intersected. This technique is easily extendible to more than two columns.

These semantic relational operators are practically important because they enable a translation from a higher-level language, such as SQL extended with User Defined Functions (UDFs), to a minimal set of operators that are amenable to query optimization and can be used in performing the query operations.

In some embodiments of the present invention, a system, computer program product, and method for efficiently implementing semantic relational operators performs the following operations: (i) enabling relational query optimizers to semantically execute core relational operations (select, project, join, group-by) using distance-based similarity measures, wherein the similarity computations are executed in a vector space using a vector nearest-neighbor based computation to execute those operators; and (ii) enabling relational systems to match entities by their semantics, which is determined by their context (rather than by value-based matching).

IV. DEFINITIONS

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A method, comprising:
generating, by one or more processors, a vector space model based on a textual representation of a first database;
training, by one or more processors, the vector space model, wherein the training includes hashing vectors in the vector space model to respective keys, and wherein vectors having a same direction in the vector space model are hashed to the same respective key;
receiving, by one or more processors, a query of the first database, wherein the query includes: (i) an operand, and (ii) an operator indicating a distance-based similarity measure; and
determining, by one or more processors, a result set based on the query, wherein the result set includes a plurality of records, wherein a record is included in the result set based on a vector nearest-neighbor computation between: (i) a first vector corresponding to the operand, and (ii) a second vector corresponding to the record, wherein the second vector is included in the vector space model, and wherein the second vector has a respective key within a certain Hamming distance of a respective key of the first vector.

2. The method of claim 1, further comprising:
generating, by one or more processors, the textual representation of the first database, wherein the textual representation includes a concatenation of a plurality of tables of the first database related by a foreign key.

3. The method of claim 2, wherein the vector space model is further trained based on: (i) text entity sequences derived, at least in part, from one or more databases, including the first database; and (ii) text entity sequences derived, at least in part, from an external data source.

4. The method of claim 2, wherein generating the textual representation of the first database further comprises pre-processing, by one or more processors, the textual representation, wherein the pre-processing includes lowercasing, lemmatization, word grouping, and tokenization.

5. The method of claim 1, wherein the vector-nearest neighbor computation is performed in accordance with an ordinal cosine distance.

6. The method of claim 1, wherein the query corresponds to a structured query language (SQL) query.

7. A computer program product, comprising:
one or more computer readable storage media; and
program instructions stored on the one or more computer readable storage media, the stored program instructions comprising:
program instructions to generate a vector space model based on a textual representation of a first database;
program instructions to train the vector space model, wherein the training includes hashing vectors in the vector space model to respective keys, and wherein vectors having a same direction in the vector space model are hashed to the same respective key;
program instructions to receive a query of the first database, wherein the query includes: (i) an operand, and (ii) an operator indicating a distance-based similarity measure; and
program instructions to determine a result set based on the query, wherein the result set includes a plurality of records, wherein a record is included in the result set based on a vector nearest-neighbor computation between: (i) a first vector corresponding to the operand, and (ii) a second vector corresponding to the record, wherein the second vector is included in the vector space model, and wherein the second vector has a respective key within a certain Hamming distance of a respective key of the first vector.

8. The computer program product of claim 7, the stored program instructions further comprising:
program instructions to generate the textual representation of the first database, wherein the textual representation includes a concatenation of a plurality of tables of the first database related by a foreign key.

9. The computer program product of claim 8, wherein the vector space model is further trained based on: (i) text entity sequences derived, at least in part, from one or more databases, including the first database; and (ii) text entity sequences derived, at least in part, from an external data source.

10. The computer program product of claim 8, wherein the program instructions to generate the textual representation of the first database further comprise program instructions to pre-process the textual representation, wherein the pre-processing includes lowercasing, lemmatization, word grouping, and tokenization.

11. The computer program product of claim 7, wherein the vector-nearest neighbor computation is performed in accordance with an ordinal cosine distance.

12. The computer program product of claim 7, wherein the query corresponds to a structured query language (SQL) query.

13. A computer system, comprising:
   one or more computer processors;
   one or more computer readable storage media; and
   program instructions, stored on the one or more computer readable storage media for execution by at least one of the one or more processors, the stored program instructions comprising:
      program instructions to generate a vector space model based on a textual representation of a first database;
      program instructions to train the vector space model, wherein the training includes hashing vectors in the vector space model to respective keys, and wherein vectors having a same direction in the vector space model are hashed to the same respective key;
      program instructions to receive a query of the first database, wherein the query includes: (i) an operand, and (ii) an operator indicating a distance-based similarity measure; and
      program instructions to determine a result set based on the query, wherein the result set includes a plurality of records, wherein a record is included in the result set based on a vector nearest-neighbor computation between: (i) a first vector corresponding to the operand, and (ii) a second vector corresponding to the record, wherein the second vector is included in the vector space model, and wherein the second vector has a respective key within a certain Hamming distance of a respective key of the first vector.

14. The computer system of claim 13, the stored program instructions further comprising:
   program instructions to generate the textual representation of the first database, wherein the textual representation includes a concatenation of a plurality of tables of the first database related by a foreign key.

15. The computer system of claim 14, wherein the vector space model is further trained based on: (i) text entity sequences derived, at least in part, from one or more databases, including the first database; and (ii) text entity sequences derived, at least in part, from an external data source.

16. The computer system of claim 14, wherein the program instructions to generate the textual representation of the first database further comprise program instructions to pre-process the textual representation, wherein the pre-processing includes lowercasing, lemmatization, word grouping, and tokenization.

17. The computer system of claim 13, wherein the vector-nearest neighbor computation is performed in accordance with an ordinal cosine distance.

* * * * *